(12) United States Patent
Pirngruber et al.

(10) Patent No.: US 8,192,527 B2
(45) Date of Patent: Jun. 5, 2012

(54) PURIFICATION METHOD BY HYDROGEN ADSORBTION WITH COGENERATION OF $CO_2$ STREAM PRESSURE

(75) Inventors: Gerhard Pirngruber, Charly (FR); Elsa Jolimaitre, Lyons (FR); Luc Wolff, Chaponnay (FR); Damien Leinekugel le Cocq, Lyons (FR)

(73) Assignee: IFP Energies Nouvelles, Rueil-Malamison Cedex (FR)

( * ) Notice: Subject to any disclaimer, the term of this patent is extended or adjusted under 35 U.S.C. 154(b) by 346 days.

(21) Appl. No.: 12/520,778

(22) PCT Filed: Nov. 30, 2007

(86) PCT No.: PCT/FR2007/001978
§ 371 (c)(1),
(2), (4) Date: Dec. 28, 2009

(87) PCT Pub. No.: WO2008/081102
PCT Pub. Date: Jul. 10, 2008

(65) Prior Publication Data
US 2010/0089233 A1    Apr. 15, 2010

(30) Foreign Application Priority Data
Dec. 22, 2006  (FR) ...................................... 06 11406

(51) Int. Cl.
*B01D 59/26* (2006.01)
(52) U.S. Cl. ............. 95/97; 95/45; 95/55; 95/90; 95/95; 95/96
(58) Field of Classification Search ................ 95/45, 55, 95/90, 95, 96, 97
See application file for complete search history.

(56) References Cited

U.S. PATENT DOCUMENTS

| 2,992,703 | A | * | 7/1961 | Srini Vasan et al. | 95/93 |
| 3,301,792 | A | * | 1/1967 | Lewallen et al. | 502/45 |

(Continued)

FOREIGN PATENT DOCUMENTS

EP    1018485 A    7/2000
(Continued)

OTHER PUBLICATIONS

Bourrelly, S. et al. "Different adsorption behaviors of methane and carbon dioxide in the isotypic nanoporous metal terephthalates MIL-53 and MIL-47." (Journal of the American Chemical Society), 2005, 13519-13521, 127.

(Continued)

*Primary Examiner* — Jason M Greene
*Assistant Examiner* — Anthony Shumate
(74) *Attorney, Agent, or Firm* — Millen, White, Zelano & Branigan, P.C.

(57) ABSTRACT

The present invention relates to a method of producing hydrogen of very high purity from a feed predominantly containing said hydrogen and a minor part of impurities mainly consisting of carbon dioxide, carbon monoxide, methane and heavier hydrocarbons. The purification method by hydrogen adsorption using a desorption stage at a lower pressure than the pressure of the feed, such as a PSA method for example, allows to produce the desorption stream and notably to recover the carbon dioxide under pressure and high-purity hydrogen, with a high yield. These performances are obtained by combining the successive stages of the method according to the invention with the use of a new family of adsorbent whose dynamic capacity at a high desorption pressure is greater than that of conventional adsorbents.

23 Claims, 3 Drawing Sheets

U.S. PATENT DOCUMENTS

| | | | | |
|---|---|---|---|---|
| 5,689,974 | A * | 11/1997 | Fujita et al. | 62/644 |
| 5,846,295 | A * | 12/1998 | Kalbassi et al. | 95/105 |
| 6,179,900 | B1 | 1/2001 | Behling et al. | |
| 6,294,501 | B1 * | 9/2001 | Chang | 502/418 |
| 2001/0009125 | A1 | 7/2001 | Monereau et al. | |
| 2004/0045434 | A1 * | 3/2004 | Golden et al. | 95/96 |
| 2007/0068389 | A1 * | 3/2007 | Yaghi | 96/148 |

FOREIGN PATENT DOCUMENTS

| | | |
|---|---|---|
| EP | 1120149 A | 8/2001 |
| GB | 1241065 A | 7/1971 |
| WO | PCTFR2007001978 R | 7/2008 |

OTHER PUBLICATIONS

Himeno, S. et al. "High-Pressure Adsorption Equilibria of Methane and Carbon Dioxide on Several Activated Carbons." (Journal of Chemical and Engineering Data), 2005, 369-376, 50:2.

Knowles, et al. "Aminopropyl-functionalized mesoporous silicas as $CO_2$ adsorbents." (Fuel Processing Technology), Oct. 1, 2005, 1435-1448, 86:14-15.

* cited by examiner

PURIFICATION METHOD BY HYDROGEN ADSORBTION WITH COGENERATION OF $CO_2$ STREAM PRESSURE

FIELD OF THE INVENTION

The present invention relates to a purification method by adsorption of the hydrogen resulting from synthesis gas with cogeneration of a stream of impurities and particularly $CO_2$, at a pressure above 0.4 MPa.

BACKGROUND OF THE INVENTION

Hydrogen production is a high concern in the fields of energy, refining and petrochemical industry. Hydrogen can be used for example as fuel for fuel cells and for the production of energy by combustion in gas turbines. Hydrogen is also used as a reagent in many refining and petrochemistry processes, as well as for the production of ammonia.

Hydrogen is predominantly produced from hydrocarbon-containing feeds of various origins (natural gas, petroleum cuts, biomass, etc.). The main hydrogen production processes using such feeds are steam reforming, gasification, partial oxidation and autothermal reforming. All these methods allow to produce synthesis gas that predominantly contains hydrogen, carbon monoxide (CO) and carbon dioxide ($CO_2$), as well as methane ($CH_4$) and heavier hydrocarbons and, if air is used in the conversion process, nitrogen and argon or any other molecule initially present in air. Hydrogen therefore has to be purified prior to final use.

Several techniques for purifying hydrogen are known from the prior art: separation through absorption by a chemical solvent (of the amines family for example) or a physical solvent, separation by pressure swing adsorption (PSA) or membrane separation.

The absorption methods using amines do not allow all the impurities to be removed, notably molecules such as nitrogen, argon, carbon monoxide and methane.

The performances of hydrogen purification methods using membranes greatly depend on the membrane material used. Only mixed metals (palladium alloys for example) and oxides allow to obtain CO contents in the final hydrogen comparable to those of the hydrogen produced by PSA. Now, these membranes are very costly and can only work at very high temperatures (above 350° C.), which considerably increases the total hydrogen production cost.

PSA therefore is the most suitable method for producing high-purity hydrogen.

The principle of PSA is well known to the person skilled in the art. The gas to be purified flows, at the high pressure of the cycle referred to as "adsorption pressure", through adsorbent material layers that preferably retain the impurity (or impurities). These compounds are then extracted from these adsorbents by lowering the pressure down to a pressure referred to as "desorption pressure". The principle of PSA is to cyclically link together these high-pressure adsorption and low-pressure desorption stages.

The purified hydrogen stream is thus produced at high pressure, whereas the residual impurity-rich stream is produced at low pressure.

PSA performances are evaluated by determining the value of the dynamic capacity of an adsorbent. The dynamic capacity of an adsorbent is defined as the difference between the adsorbed amount under the adsorption stage conditions and the amount that remains adsorbed after desorption. The dynamic capacity depends on the adsorption isotherms of the various feed constituents. Regardless of the kinetic effects, the dynamic capacity of a given constituent can be assessed by calculating the difference between the adsorbed amount at adsorption pressure $P_{ads}$ and the adsorbed amount at desorption pressure $P_{des}$ for this constituent (FIG. 1). PSA performances are mainly characterized by the purity of the hydrogen produced, the hydrogen yield (i.e. the amount of hydrogen produced in relation to the amount of hydrogen contained in the feed) and the productivity (the amount of hydrogen produced in relation to the mass of adsorbent contained in the process and in relation to time). These three performance characteristics are connected. For a given dynamic capacity, one of these performances can only be increased to the detriment of another or of the other two. For example, if a certain purity is obtained for a given productivity, the purity is lower for a higher productivity. On the other hand, a dynamic capacity increase can allow to increase one of these performances while maintaining the others constant. A certain purity can be obtained for a given feed flow rate, or a lower purity for a higher feed flow rate.

Conventional PSA for hydrogen purification contains several adsorbent layers. In general, an activated charcoal layer is first used to adsorb the $CO_2$, then a zeolite 5A or NaX layer to adsorb the $CH_4$, the CO and the other impurities possibly present in the feed. When water is present in the feed, the PSA process can also contain a preliminary silica gel layer.

These adsorbents have good adsorption capacities at high pressure for the various impurities contained in the feed. On the other hand, their regeneration (impurity desorption) requires lower pressures close to atmospheric pressure. It can be seen on curve (a) in FIG. 1 that the dynamic capacity of conventional adsorbents drops considerably when the desorption pressure is too high. Consequently, the $CO_2$-rich stream resulting from hydrogen purification by conventional PSA is always produced at low pressure.

Production of a residual stream of impurities at high pressure could have applications for the production of energy (by combustion for example), in the chemical industry (methanol and dimethylether synthesis, supercritical solvent, etc.), in the drilling sphere (enhanced oil recovery) or for $CO_2$ storage (after compression and/or liquefaction), etc.

Several solutions allowing to produce the impurity stream at a higher pressure have been provided in the prior art.

Patent application WO-2006/112,724 describes a method of producing hydrogen for gas turbines, from methane steam reforming. The mixture leaving the water gas shift reactor is separated by PSA to produce a hydrogen-rich stream containing 10-20% impurities (CO, $CH_4$ and $CO_2$) and a residual stream predominantly containing $CO_2$, as well as CO, $H_2O$, $H_2$ and $CH_4$. The method described aims to recover this residual stream at a high pressure and not at atmospheric pressure so as to reduce its recompression cost. No technical solution has however been provided to produce the $CO_2$ at high pressure while maintaining good performances for hydrogen purification.

Patent application WO-2006/097,703 describes a method of producing hydrogen for either the production of energy by combustion or as high-purity fuel, with recovery of the $CO_2$ coproduced. A PSA process is proposed as the preferred separation mode because it allows to reach very high hydrogen purities. The $CO_2$-rich residual gas resulting from PSA is recovered by condensation. In order to reduce the $CO_2$ recompression cost, the method described aims to maintain a high residual gas pressure at the PSA outlet. This desorption pressure increase leads to a dynamic capacity loss and lowers the hydrogen yield. It is therefore necessary to reach a compromise between the hydrogen recovery ratio and the residual gas pressure.

Patent application WO-00/18,680 describes a method of producing hydrogen for gas turbines, combined with separation and sequestration of the $CO_2$ coproduced. The operating pressures of the steam reforming reactor and of the water gas shift reactor are very high. The $H_2$/impurities separation unit is therefore also operated at a very high pressure. The preferred separation mode is $CO_2$ absorption by an amine solution. The amine solution is regenerated at a pressure ranging between 0.5 and 0.8 MPa. The implementation proposed does not allow to produce a high-purity hydrogen stream because the amine solution does not absorb carbon monoxide and methane. The scheme is therefore only suited for the use of hydrogen for gas turbines.

Patent application WO-2003/070,357 describes a PSA process of separating a gaseous mixture containing hydrogen and impurities of hydrocarbon type allowing to produce a high-purity hydrogen stream and a hydrocarbon-rich residual stream. To upgrade the residual stream, it is interesting to obtain it at a high pressure, above 0.4 MPa. The adsorbent used is a combination of an activated charcoal and of a silica gel, which allows to desorb the hydrocarbons at high pressures, but with a very appreciable hydrogen yield loss. Activated charcoal and silica gel are adsorbents that are well known to the person skilled in the art but they do not have a satisfactory dynamic capacity as regards $CO_2$ when desorption is carried out at high pressures.

Analysis of the state of the prior art shows that the advantage of co-producing a $CO_2$ stream at high pressure during hydrogen purification has been identified. Now, the solutions provided do not allow to co-produce $CO_2$ under pressure without a compromise as regards the hydrogen yield and/or purity. They are based on changes in the operating conditions of existing processes, which involve a purity or a hydrogen yield decrease.

SUMMARY OF THE INVENTION

The present invention relates to a method of producing hydrogen of very high purity from a feed predominantly containing said hydrogen and a minor part of impurities mainly consisting of carbon dioxide, carbon monoxide, methane, said feed being introduced into at least one adsorption column, said method comprising at least the following stages:

a) a stage of partial or complete, cocurrent or counter-current pressurization of said feed until the pressure of the adsorption stage ($P_{ads}$) is reached, by means of an additional pure hydrogen or feed stream, b) a stage of adsorption at high pressure $P_{ads}$ of the impurities of the feed pressurized in stage a), carried out on an adsorbent solid contained in one or more beds, c) a stage of cocurrent or counter-current depressurization of the stream from stage b) until the desorption pressure $P_{des}$ above 0.4 MPa is reached, d) a cocurrent or counter-current desorption stage at high pressure $P_{des}$, said pressure $P_{des}$ being lower than the adsorption stage pressure.

"Predominantly" means a hydrogen content of at least 50% by mole, preferably at least 70% by mole, the maximum proportions of main impurities being 50% by mole for carbon dioxide, 20% by mole for carbon monoxide and 10% by mole for methane. For the preferred feeds, the impurities mainly consist of carbon dioxide.

The object of the invention thus is a hydrogen purification method by adsorption using a desorption stage at a lower pressure than the feed pressure, such as a PSA process for example, allowing to produce the desorption stream and notably to recover the carbon dioxide under pressure and hydrogen of high purity and with a high yield.

These performances are obtained by combining the successive stages of the method according to the invention with the use of a new adsorbent family whose dynamic capacity at a high desorption pressure is higher than that of conventional adsorbents.

DETAILED DESCRIPTION

Figure 1:
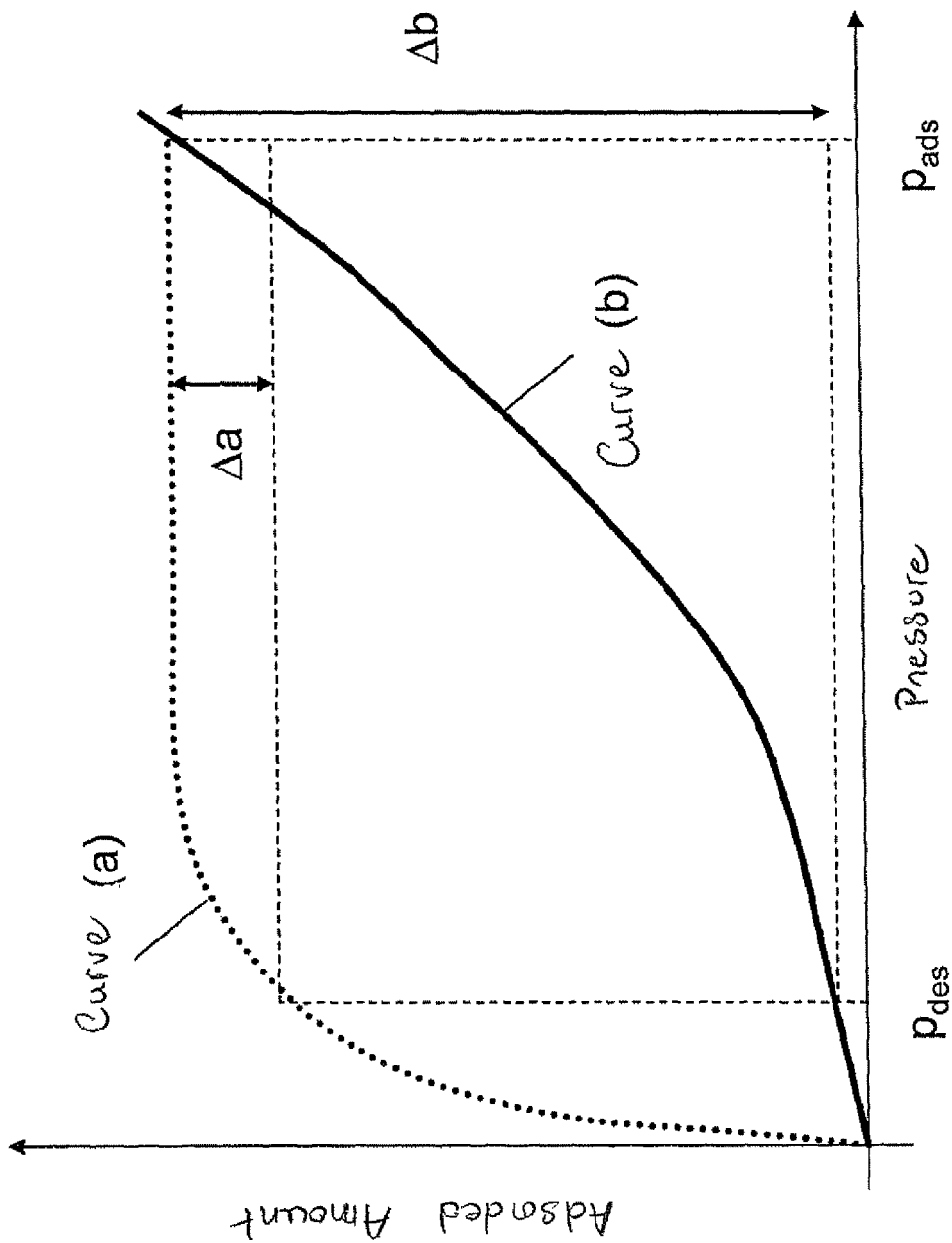
FIG. 1 shows the adsorbed amount variation as a function of the pressure for two adsorbent types: conventional adsorbent (curve a)) and adsorbent according to the invention (curve b))

The present invention relates to a method of producing hydrogen of very high purity from a feed predominantly containing said hydrogen and a minor part of impurities mainly consisting of carbon dioxide, carbon monoxide, methane and heavier hydrocarbons, said feed being introduced into at least one adsorption column, said method comprising at least the following stages:

a) a stage of partial or complete, cocurrent or counter-current pressurization of said column until the pressure of the adsorption stage ($P_{ads}$) is reached, by means of an additional pure hydrogen or feed stream, b) a stage of adsorption at high pressure $P_{ads}$ of the impurities of the feed pressurized in stage a), carried out on an adsorbent solid contained in one or more beds, c) a stage of cocurrent or counter-current depressurization of the stream from stage b) until the desorption pressure $P_{des}$ above 0.4 MPa is reached, d) a cocurrent or counter-current desorption stage at high pressure $P_{des}$, said pressure $P_{des}$ being lower than the adsorption stage pressure.

The method of separation by adsorption according to the invention also involves the use of specific adsorbent families allowing to recover the impurity stream essentially containing $CO_2$, at a pressure above 0.4 MPa, while producing hydrogen of high purity with a high hydrogen yield.

The purity of the hydrogen stream obtained is above 99% by volume and preferably above 99.9% by volume, more preferably above 99.99% by volume.

The hydrogen yield of the method according to the invention is above 80% and preferably above 90%.

The $CO_2$ yield of the method according to the invention is above 50% and preferably above 70%.

The adsorbents according to the invention are defined by their dynamic adsorption capacity between adsorption pressure $P_{ads}$ and desorption pressure $P_{des}$, $P_{des}$ being above 0.4 MPa.

The adsorbents used in the method according to the invention have a $CO_2$ dynamic capacity of at least 2 mmole/g and preferably at least 4 mmole/g between $P_{ads}$=5 MPa and $P_{des}$=0.4 MPa.

In a preferred embodiment of the method according to the invention, the adsorbents used in said method are characterized by a $CO_2$ dynamic capacity of at least 2 mmole/g and preferably at least 4 mmole/g between $P_{ads}$=3 MPa and $P_{des}$=0.4 MPa.

In a more preferred embodiment of the method according to the invention, the adsorbents used in said method are characterized by a $CO_2$ dynamic capacity of at least 2 mmole/g and preferably at least 4 mmole/g between $P_{ads}$=3 MPa and $P_{des}$=0.5 MPa.

The dynamic capacity ranges between 2 and 40 mmole/g.

The adsorption pressure $P_{ads}$ ranges between 1.5 and 5 MPa, preferably between 2 and 4 MPa.

The desorption pressure $P_{des}$ ranges between 0.4 and 2 MPa, preferably between 0.4 and 0.6 MPa.

The adsorbents exhibiting these properties have very different chemical compositions and pore structures. The adsorbents described in the present patent are not limitative and are only mentioned by way of example.

The desired characteristics are preferably, but not exclusively found with structures having a pore size ranging between 5 and 50 Å, preferably between 7 and 25 Å. The pore volume of these compounds, due to the aforementioned pore size, ranges between 0.5 and 5 ml/g, preferably between 0.8 and 3 ml/g.

Some adsorbents having the required properties belong to the MOF (Metal-Organic Frameworks) family. Examples thereof are the following compounds: IRMOF-1, IRMOF-3, IRMOF-6, IRMOF-11, MOF-177, $Cu_3(4,4',4''$-s-triazine-2,4,6-triyl-tribenzoate$)_2$ also known as $Cu_3(tatb)_2$, MIL-100, MIL-101, etc.

Compounds such as the breathing MOFs, i.e. flexible structures whose pores open to obtain sizes above 5 Å at high pressure (adsorption pressure), such as MIL-53, also have the required characteristics for the adsorption method according to the present invention.

The properties of these materials are for example described in patent U.S. Pat. No. 6,930,193, in the article by Serre, C and coll., J. Am. Chem. Soc. 124 (2002) 13519 or in the article by Ferey, G and coll., Angew. Chemie Int. Ed. 43 (2004) 6296.

Some adsorbents of the MOF family have an increased dynamic capacity in the presence of certain polar impurities such as water. However, if the impurity is not initially present in the feed, it can be added in order to optimize the dynamic capacity of the adsorbent.

Said characteristics are also found in other families of materials such as mesoporous silicas and mesoporous activated charcoals having a specific surface area above 2000 $m^2$/g and preferably ranging between 2000 and 4000 $m^2$/g.

In general terms, without being bound by any theory, it has been observed that most adsorbents having a high dynamic capacity and meeting the criteria of the present invention have a particular isotherm shape.

In FIG. 1, curve (a) diagrammatically represents the isotherm of a conventional adsorbent of type I. Curve (b) represents the isotherm of an adsorbent having a high dynamic capacity (type II). The values of the dynamic capacity in the figure correspond to Δa for curve (a) and to Δb for curve (b).

The high dynamic capacity of the adsorbents according to the invention for $CO_2$ between adsorption pressure $P_{ads}$ and regeneration pressure $P_{des}$ above 0.4 MPa is often explained by the shape of their $CO_2$ isotherm. The slope of the isotherm is shallow and/or the slope of the isotherm increases at high pressures. This isotherm shape allows to obtain a high dynamic capacity between $P_{ads}$ and $P_{des}$, $P_{ads}$ being the partial pressure in the adsorption stage and $P_{des}$ the partial pressure in the desorption stage. Isotherms of type II, III, IV and V according to the classification by Brunauer, Deming, Deming and Teller (J. Am. Chem. Soc. 62, 1940, 1723) have a shape that is rather favourable to the use of such adsorbents in the method according to the invention.

The aforementioned adsorbent minimum dynamic capacity values only relate to the adsorption of $CO_2$ on said adsorbents. According to the adsorption of the other impurities, in particular methane and carbon monoxide, various implementations of the invention, detailed hereafter, can be considered. It can be advantageous to use a mixture of adsorbents to optimize the adsorption of the various impurities.

The composition of the feed to be purified can vary depending on the origin of the synthesis gas. Generally, the term "impurities" designates all the elements in admixture with the hydrogen of the feed, i.e. mainly carbon dioxide, carbon monoxide and possibly methane, water, nitrogen, argon, heavier hydrocarbons in very small amounts. Any feed having a composition characterized by a major part (i.e. greater than or equal to 50% by mole) of hydrogen and a minor part of impurities based on $CO_2$, CO and possibly methane, water, nitrogen, argon and heavier hydrocarbons, in any proportions, can constitute a feed of the method according to the present invention.

The method is all the more interesting as the main impurity is carbon dioxide.

The feed of the method according to the invention can come from any process of converting carbon-containing feeds to synthesis gas, such as catalytic steam reforming, partial oxidation and autothermal reforming. Generally, the feed of the method according to the invention does preferably not directly come from this type of process and has preferably been subjected to a post-treatment in a water gas shift type reactor so as to increase the $CO_2$ content and the hydrogen yield.

The method according to the invention comprises various stages for which we use the following conventions in the text hereafter: what is referred to as supply end is the end of the bed through which the feed is introduced during the adsorption stages, and what is referred to as production end is the end of the bed through which the pure hydrogen is discharged during the adsorption stage.

The method according to the invention comprises at least the following stages:

a) a stage of partial or complete, cocurrent or counter-current pressurization: the bed is pressurized until the pressure of the adsorption stage is reached via the supply end or the production end, by means of an additional pure hydrogen or feed stream, b) a stage of adsorption at high pressure $P_{ads}$: the feed is introduced via the supply end of an adsorbent bed. The impurities are adsorbed in at least one bed, and pure hydrogen is obtained, at high pressure, at the bed outlet (production end). Several beds can be arranged in series during the high-pressure adsorption stage so as to obtain the pure hydrogen stream at the outlet of the last bed, c) a stage of cocurrent or counter-current depressurization: the bed is depressurized until desorption pressure $P_{des}$ is reached, via the production or the supply end, d) a cocurrent or counter-current desorption stage at high pressure $P_{des}$, said pressure being lower than the adsorption stage pressure: the gas stream obtained essentially consists of desorbed impurities, notably $CO_2$ obtained at pressure $P_{des}$.

The method of separation by adsorption according to the invention uses at least four adsorbent beds, preferably at least ten adsorbent beds, said beds containing at least partly an adsorbent belonging to the adsorbent families described above.

The working temperature ranges between 10° C. and 250° C., preferably between 10° C. and 100° C., and most preferably between 10° C. and 50° C.

The method according to the invention as described above can involve at least two more particular embodiments: the PSA method (Pressure Swing Adsorption) and the Simulated Moving Bed method (SMB).

A first embodiment (PSA) can include at least 3 different variants. It can be reminded that the PSA method consists of several beds filled with adsorbent that follow a cycle comprising several stages. The variants described below specify some of these stages according to the behaviour of the various impurities of the feed on the adsorbent.

According to the first variant, the impurities other than $CO_2$ ($CH_4$, CO, . . . ) have an affinity towards the adsorbent close to that of $CO_2$ on at least one of the adsorbents of the method according to the invention, in which case a conventional PSA cycle applied to the production of hydrogen is used. It includes for example various stages in the following order:

a) pressurization stage(s) (partial or complete, cocurrent or counter-current, possibly pressure equalization), b) high-pressure adsorption stage, c1) cocurrent partial depressurization stage(s) (generally pressure equalization), c2) counter-current depressurization stage(s) (possibly pressure equalization), d) counter-current desorption stage at a lower pressure than the adsorption pressure.

When the impurities other than $CO_2$ ($CH_4$, CO, . . . ) have an affinity towards the adsorbent that is markedly lower than that of $CO_2$, at least one adsorbent bed comprises two different adsorbent types, the first one having a dynamic capacity of at least 2 mmole/g between an adsorption pressure ($P_{ads}$) of 5 MPa and a desorption pressure ($P_{des}$) of 0.4 MPa, and a second adsorbent for adsorption of the impurities other than $CO_2$.

According to a second variant, the impurities other than $CO_2$ ($CH_4$, CO, . . . ) have an affinity towards the adsorbent that is markedly lower than that of $CO_2$, in which case one uses one of the adsorbents having a high dynamic capacity for $CO_2$ as defined above in a first layer of the bed, said layer being followed by a second layer consisting of another adsorbent intended to adsorb the other impurities. The two adsorbents are thus distributed in two successive bed layers.

The PSA cycle is then adapted by imposing at least two desorption stages at different pressures. The cycle is for example as follows:

a) pressurization stage(s) (partial or complete, cocurrent or counter-current, possibly pressure equalization), b) high-pressure adsorption stage, c1) cocurrent depressurization stage(s) (possibly pressure equalization), c2) counter-current depressurization stage(s) (possibly pressure equalization), d) counter-current desorption stage at desorption pressure $P_{des}$ (between 2 and 0.4 MPa), e) cocurrent or counter-current low-pressure desorption stage (desorption pressure for the other impurities: between 0.4 MPa and atmospheric pressure).

According to a third variant, the impurities other than $CO_2$ ($CH_4$, CO, . . . ) have an affinity towards the adsorbent that is markedly lower than that of $CO_2$, in which case one uses at least one of the adsorbents having a high dynamic capacity for $CO_2$ as defined above in a specific bed. A second bed containing another adsorbent intended to adsorb the other impurities is arranged in series with the first bed containing at least one of the adsorbents having a high dynamic capacity as defined above.

The two adsorbents are thus distributed in at least two specific beds.

The bed having adsorbed the $CO_2$ and the bed having adsorbed the other impurities can then be regenerated independently and at different pressures. The PSA cycle is then different for the various beds.

The first bed containing one of the adsorbents of the method according to the invention, the PSA cycle is for example adapted as follows, with a desorption pressure ranging between 2 and 0.4 MPa:

a) pressurization stage(s) (partial or complete, cocurrent or counter-current, possibly pressure equalization), b) high-pressure adsorption stage (in series with the second bed), c) cocurrent and/or counter-current depressurization stage(s), d) counter-current desorption stage at pressure $P_{des}$.

The second bed containing the adsorbent suited to adsorb the impurities other than $CO_2$, a conventional PSA cycle is applied, with low-pressure desorption (pressure lower than the desorption pressure of the first bed):

a) pressurization stage(s) (partial or complete, cocurrent or counter-current, possibly pressure equalization), b) high-pressure adsorption stage (in series with the first bed), c1) cocurrent partial depressurization stage(s) (generally pressure equalization), c2) counter-current depressurization stage(s), d) counter-current low-pressure (between 0.1 and 0.4 MPa) desorption stage.

A second embodiment of the method according to the invention is an operation using the principle of gas phase simulated moving bed (SMB) wherein desorption of the adsorbent is carried out by depressurization with or without desorbent injection.

The principle of the simulated moving bed is well known to the person skilled in the art, and several studies describe a process of this type using a depressurization stage for regenerating the adsorbent [U.S. Pat. No. 6,293,999; Rao et al., 2005, Journal of Chromatography A, n°1069, p. 141].

Regenerating the adsorbent under pressure allows to recover the $CO_2$ under pressure in the extract.

This particular embodiment uses an adsorbent of the method according to the invention such that the impurities other than $CO_2$ ($CH_4$, CO, . . . ) have adsorption properties close to $CO_2$.

A detailed description of an SMB method applied to the purification of hydrogen is provided in patent application FR-06/08,804 filed by the applicant.

It can be reminded that a column operating under simulated moving bed conditions consists of several fixed adsorbent beds and comprises a plurality of inlets (for the feed and the eluent) and outlets (for the extract and the raffinate) distributed over the length thereof, these inlets and outlets being evenly shifted over the course of time while respecting their relative positions, so as to cover all of the possible positions and thus to create a fictitious displacement of the adsorbent counter-current to the fluid.

The method according to the invention takes up the principle of said method described in patent application FR-06/08,804, while replacing or completing the desorption stage using a desorbent by a depressurization/desorption/repressurization stage.

The first variant of the second embodiment of the method according to the invention corresponds to a 3-zone SMB process with at least one extract withdrawal point.

The second variant of the SMB mode of the method according to the invention corresponds to a 2-zone SMB process with at least one extract withdrawal point.

Figure 2:
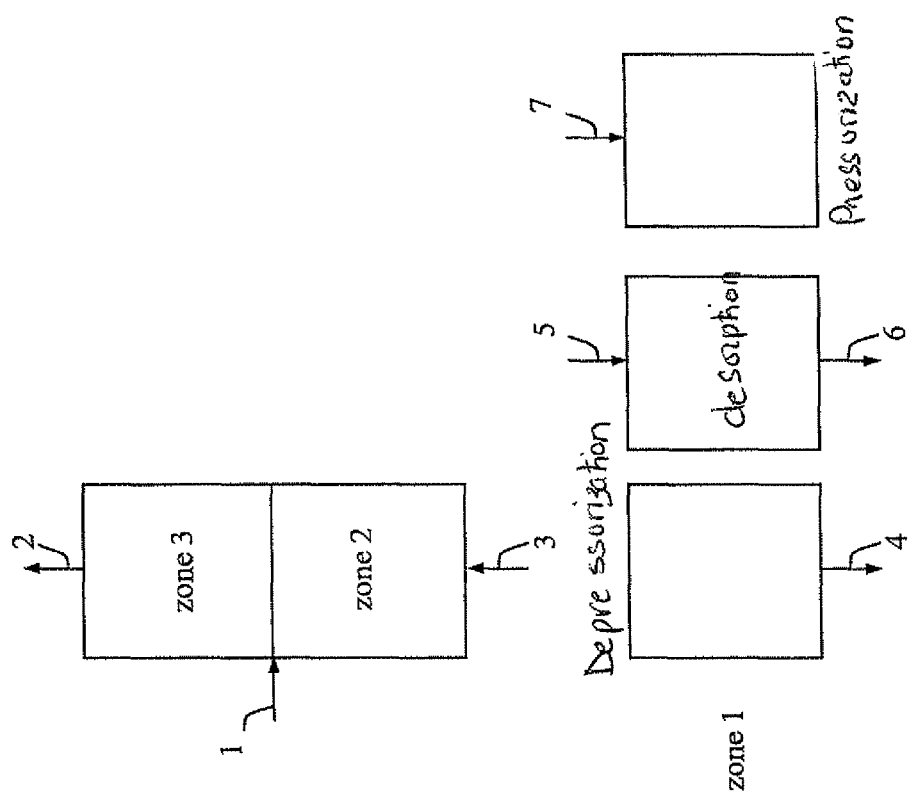
FIG. 2 shows a process flow diagram corresponding to the embodiment of the method according to the invention in a simulated moving bed (SMB) with three zones, having at least one extract withdrawal point.

The first variant of the second embodiment of the method according to the invention is illustrated by FIG. 2 given by way of non limitative example. It comprises the following stages:

a) a stage of contacting under suitable adsorption conditions (notably at a pressure $P_{ads}$) feed (1) containing hydrogen and impurities with an adsorbent solid (also referred to as adsorbent) contained in a plurality of beds so as to preferably adsorb the impurities, b) a stage of displacement of the hydrogen contained in the interstitial and macroporous volumes, c) an adsorbent desorption stage comprising:
one or more cocurrent or counter-current depressurization substages at a high pressure $P_{des}$ lower than pressure $P_{ads}$. This stage can possibly involve addition of a desorbent (such as, for example, a hydrocarbon having 3 to 9 carbon atoms),
a desorption substage at pressure $P_{des}$ during which the bed is swept by a gas stream (desorbent or hydrogen) (5),
one or more cocurrent or counter-current repressurization substages with part of the pure hydrogen stream (raffinate) or with a desorbent stream (7), The extract stream (4 and 6) is obtained during the bed depressurization and desorption substages, and it contains the impurities and possibly part of the desorbent, If the impurities have different affinities with the adsorbent solid, it is possible to regenerate the bed at different pressures, by applying several times the series of the first two substages described above. This allows to differentiate the extract streams having different compositions and pressure levels, d) a stage of withdrawal of a raffinate (2) containing the purified hydrogen and possibly part of the desorbent, e) in case of use of a desorbent, a stage of separation of the extract into a first stream containing the desorbent and a second stream containing the impurities, f) in case of use of a desorbent, a stage of separation of the raffinate into a first stream containing the desorbent and a second stream containing the high-purity hydrogen.

It is reminded that what is referred to as high purity is a hydrogen content in the effluent of the present method equal to or greater than 99.9% by mole and preferably greater than 99.99% by mole.

The unit intended for separation by adsorption according to the simulated moving bed technique comprises, according to this first variant, three zones delimited by the injections of feed and possibly of desorbent and the raffinate withdrawal as follows:

zone 1 corresponding to the bed(s) in the phase of desorption of the impurities predominantly consisting of carbon dioxide, carbon monoxide and methane. It comprises at least one bed, zone 2 allows to increase the hydrogen yield by displacement of the hydrogen within the macroporous and interstitial volumes through sweeping by a stream (3) containing either desorbent or a mixture of impurities, and a small proportion of hydrogen, such as for example part of the extract stream repressurized to the adsorption pressure. This zone is located between zone 1 and feed injection point (1). It comprises at least one bed, zone 3, where adsorption of the impurities takes place, is located between feed injection point (1) and raffinate withdrawal point (2). It comprises at least one bed and preferably at least three beds.

Figure 3:
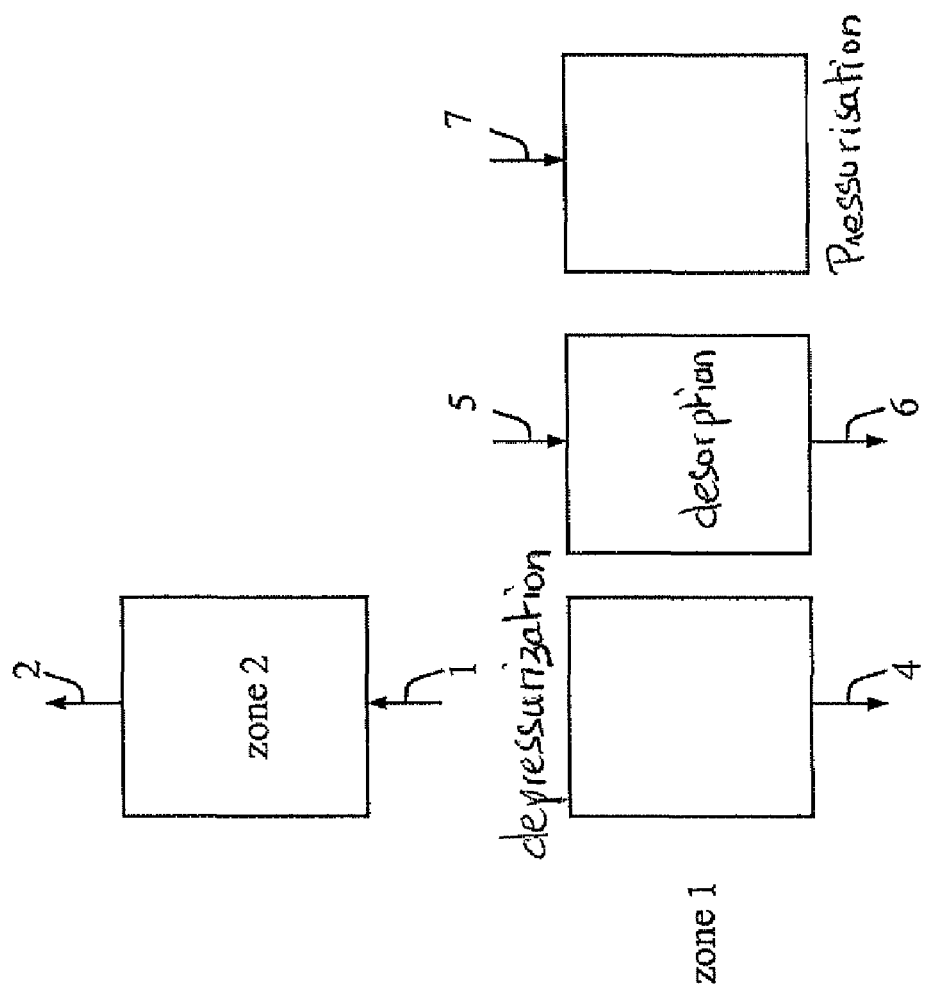
FIG. 3 shows a process flow diagram corresponding to the embodiment of the method according to the invention in a simulated moving bed (SMB) with two zones, having at least one extract withdrawal point.

The second variant of the SMB mode of the method according to the invention is illustrated by FIG. 3 given by way of non limitative example. It comprises the following stages:

a) a stage of contacting under suitable adsorption conditions (notably at a pressure $P_{ads}$) feed (1) containing hydrogen and impurities with an adsorbent solid (also referred to as adsorbent) contained in a plurality of beds so as to preferably adsorb the impurities, b) an adsorbent desorption stage comprising:
one or more cocurrent or counter-current depressurization substages at a high pressure $P_{des}$ lower than pressure $P_{ads}$. This stage can possibly involve addition of a desorbent (such as, for example, a hydrocarbon having 3 to 9 carbon atoms),
a desorption substage at pressure $P_{des}$ during which the bed is swept by a gas stream (desorbent or hydrogen) (5),
one or more cocurrent or counter-current repressurization substages with part of the pure hydrogen stream (raffinate) or with a desorbent stream (7), The extract stream (4 and 6) is obtained during the bed depressurization and desorption substages, and it contains the impurities and possibly part of the desorbent, If the impurities have different affinities with the adsorbent solid, it is possible to regenerate the bed at different pressures, by applying several times the series of the first two substages described above. This allows to differentiate the extract streams having different compositions and pressure levels, c) a stage of withdrawal of a raffinate (2) containing the purified hydrogen and possibly part of the desorbent, d) in case of use of a desorbent, a stage of separation of the extract into a first stream containing the desorbent and a second stream containing the impurities, e) in case of use of a desorbent, a stage of separation of the raffinate into a first stream containing the desorbent and a second stream containing the high-purity hydrogen.

The unit intended for separation by adsorption according to the simulated moving bed technique comprises, according to this second variant, two zones delimited by the injection of feed and the withdrawal of raffinate as follows:

zone 1 corresponding to the bed(s) in the phase of desorption of the impurities predominantly consisting of carbon dioxide, carbon monoxide and methane. It comprises at least one bed, zone 2, where adsorption of the impurities takes place, is located between feed injection point (1) and raffinate withdrawal point (2). It comprises at least one bed, preferably at least three beds.

It can be interesting to couple the method according to the invention with another separation method. Thus, one can advantageously recover part of the hydrogen contained in the $CO_2$-rich residual stream by addition of a separation process allowing to selectively separate part of the hydrogen contained in this stream while maintaining the $CO_2$ under pressure.

It is thus possible to consider using a membrane method with a hydrogen-selective membrane. In this case, the $CO_2$ is predominantly recovered in the retentate, therefore at high pressure, whereas the hydrogen is recovered in the permeate at a lower pressure.

Similarly, coupling with another separation method can also allow to increase the purity of the $CO_2$ contained in the residual stream from the PSA process according to the invention. This can allow to reduce the supplementary compression costs, for example in the case of $CO_2$ storage. A $CO_2$ purity increase can also be of interest if the $CO_2$ produced is to be used for any complementary application. Any separation method allowing to selectively extract one of the molecules of the residual stream except the $CO_2$ while maintaining the $CO_2$-rich stream under pressure can be used. Membrane methods and solvent extraction methods can notably be mentioned.

The hydrogen produced by means of the method according to the invention can be used as the reagent in any process, notably in petrochemistry or refining, and also as fuel for fuel cells. The operating mode (sequence of adsorption/desorption cycles, number of compression and decompression stages, . . . ) of the method according to the invention can be optimized depending on the desired hydrogen purity.

EXAMPLES

The examples hereafter illustrate the invention without limiting the scope thereof.

Example 1

According to the Prior Art

For a typical synthesis gas composition of 67% by mole $H_2$ and 33% by mole $CO_2$, the other impurities being disregarded, and for an adsorption pressure $P_{ads}$ of 3 MPa, the $CO_2$ partial pressure during the adsorption stage is 1 MPa.

From the $CO_2$ adsorption capacity data described in the prior art, we calculated the dynamic capacities of three adsorbents conventionally used in hydrogen PSA processes for desorption pressures $P_{des}$ above 0.4 MPa.

TABLE 1

Adsorbent dynamic capacity (mmole/g) for a desorption pressure of 0.1, 0.4 and 0.5 MPa

| | Desorption pressure $P_{des}$ | | |
|---|---|---|---|
| | 0.1 MPa | 0.4 MPa | 0.5 MPa |
| Activated charcoal | 3.95 | 1.95 | 1.45 |
| 13X zeolite | 1.9 | 0.75 | 0.5 |
| 5A zeolite | 0.55 | 0.05 | 0.05 |

The dynamic capacities of these adsorbents are high for a desorption pressure of 0.1 MPa, but they rapidly fall when the desorption pressure is equal to or greater than 0.4 MPa. Thus, for a desorption pressure above 0.4 MPa, the performances of the method are markedly less advantageous than with a desorption pressure around 0.1 MPa (usual desorption pressure for these adsorbents). One of the three characteristic performances of the product (hydrogen purity, hydrogen yield or productivity) therefore has to be reduced.

Example 2

According to the Invention

For a typical synthesis gas composition of 67% by mole $H_2$ and 33% by mole $CO_2$, the other impurities being disregarded, and for an adsorption pressure $P_{ads}$ of 3 MPa, the $CO_2$ partial pressure during the adsorption stage is 1 MPa.

The dynamic capacities of the adsorbents of Metal-Organic Framework MOF type have been calculated from the isotherms published in the prior art.

TABLE 2

Dynamic capacity (mmole/g) of MOF adsorbents for a desorption pressure of 0.4 and 0.5 MPa

| | Desorption pressure $P_{des}$ | |
|---|---|---|
| | 0.4 MPa | 0.5 MPa |
| MIL-53 | 4.95 | 4.75 |
| IRMOF-11 | 5.1 | 4 |
| IRMOF-6 | 7 | 5.9 |
| IRMOF-1 | 7.4 | 6.2 |
| IRMOF-3 | 8 | 6.5 |
| MOF-177 | 8 | 6.9 |

It can be observed that the dynamic adsorption capacities of the adsorbents according to the invention are very markedly greater than the dynamic capacities of the adsorbents according to the prior art, for operating conditions in accordance with the adsorption separation method according to the invention.

The dynamic capacity being directly linked with the performances of the separation method, this means that, for desorption pressures above 0.4 MPa, the process working with an adsorbent according to the invention has better performances (in terms of hydrogen purity, hydrogen yield or productivity) than a process working with a conventional adsorbent as mentioned in example 1.

Consequently, the method according to the invention will have performances at least equal to and even potentially higher than the conventional method with a desorption pressure of 0.1 MPa.

Example 3

Comparative

The example compares the dynamic capacity of two different adsorbents belonging to the Metal-Organic Framework family: MIL-53 and MOF-505. The two adsorbents have the same pure $CO_2$ adsorption capacity at 1 MPa (8 mmole/g). Now, the dynamic capacity of MIL-53 between $P_{ads}$ and $P_{des}$=0.4 or 0.5 MPa is clearly higher.

TABLE 3

Dynamic capacity (mmole/g) of the two adsorbents for a desorption pressure $P_{des}$ of 0.4 and 0.5 MPa

| | Desorption pressure $P_{des}$ | |
|---|---|---|
| | 0.4 MPa | 0.5 MPa |
| MIL-53 | 4.95 | 4.75 |
| MOF-505 | 1.9 | 1.5 |

The example shows that adsorbents having very high $CO_2$ adsorption capacities at the adsorption pressure do not necessarily have high adsorption capacities when desorption pressure $P_{des}$ is above 0.4 MPa. The $CO_2$ adsorption capacity at the adsorption pressure is therefore not the important criterion for selecting an adsorbent for the method according to the invention.

FIG. 1

Quantité adsorbée: adsorbed amount
Courbe: curve
Pression: pressure

FIG. 2

Zone 1/2/3: zone 1/2/3
Dépressurisation: depressurization
Désorption: desorption
Pressurisation: pressurization

FIG. 3

Zone 1/2: zone 1/2
Dépressurisation: depressurization
Désorption: desorption
Pressurisation: pressurization.

The invention claimed is:

1. A method of producing hydrogen of very high purity from a feed predominantly containing said hydrogen and a minor part of impurities comprising mainly carbon dioxide, carbon monoxide, methane and heavier hydrocarbons, said feed being introduced into at least one adsorption column made up of a plurality of beds, said method comprising at least the following stages:
   a) a stage of partial or complete, cocurrent or counter-current pressurization of said feed until the pressure of the adsorption stage ($P_{ads}$) is reached, by an additional pure hydrogen or feed stream,
   b) a stage of adsorption at high pressure $P_{ads}$ of the impurities of the feed pressurized in stage a), carried out on an adsorbent solid contained in one or more beds,
   c) a stage of cocurrent or counter-current depressurization of the stream from stage b) until the desorption pressure $P_{des}$ above 0.4 MPa is reached,
   d) a cocurrent or counter-current desorption stage at high pressure $P_{des}$, said pressure $P_{des}$ being lower than the adsorption stage pressure,
wherein at least one adsorbent making up a bed or part of a bed has a carbon dioxide dynamic capacity of at least 2 mole/g between an adsorption pressure ($P_{ads}$) of 5 MPa and a $CO_2$ desorption pressure ($P_{des}$) of 0.4 MPa, the dynamic capacity being defined as the difference between the amount of $CO_2$ adsorbed under the adsorption stage conditions and the amount that remains adsorbed after desorption.

2. A method as claimed in claim 1, wherein the adsorption column comprising at least four adsorbent beds.

3. A method as claimed in claim 1, wherein at least one adsorbent has a carbon dioxide dynamic capacity of at least 4 mmole/g between an adsorption pressure ($P_{ads}$) of 5 MPa and a desorption pressure ($P_{des}$) of 0.4 MPa.

4. A method as claimed in claim 1, wherein at least one adsorbent has a carbon dioxide dynamic capacity of at least 2 mmole/g and between an adsorption pressure ($P_{ads}$) of 3 MPa and a desorption pressure ($P_{des}$) of 0.4 MPa.

5. A method as claimed in claim 1, wherein at least one adsorbent has a carbon dioxide dynamic capacity of at least 2 mmole/g and between an adsorption pressure ($P_{ads}$) of 3 MPa and a desorption pressure ($P_{des}$) of 0.5 MPa.

6. A method as claimed in claim 1, wherein the adsorption pressure ($P_{ads}$) ranges between 1.5 and 5 MPa and the desorption pressure ($P_{des}$) ranges between 0.4 and 2 MPa.

7. A method as claimed in claim 6, wherein adsorption pressure ($P_{ads}$) ranges between 2 and 4 MPa and desorption pressure ($P_{des}$) ranges between 0.4 and 0.6 MPa.

8. A method as claimed in claim 1, wherein said adsorbent solid has a pore size ranging between 5 and 50 Å, and a pore volume ranging between 0.5 and 5 ml/g.

9. A method as claimed in claim 8, wherein said adsorbent solid has a pore size ranging between 7 and 25 Å, and a pore volume ranging between 0.8 and 3 ml/g.

10. A method as claimed in claim 8, wherein the adsorbent solid is selected from the group of Metal-Organic Frameworks (MOFs), mesoporous silicas, and activated charcoals having a specific surface area above 2000 $m^2/g$.

11. A method as claimed in claim 8, wherein the adsorbent solid is selected from among the breathing MOFs, which are flexible structures whose pores open and whose size is above 5 Å at adsorption pressure ($P_{ads}$).

12. A method as claimed in claim 8, wherein the adsorbent solid is selected from among IRMOF-1, IRMOF-3, IRMOF-6, IRMOF-11, MOF-177, $Cu_3(tatb)_2$, MIL-100, MIL-101 and MIL-53.

13. A method as claimed in claim 1, operating at a temperature range between 10° C. and 250° C.

14. A method as claimed in claim 1 operated according to the PSA implementation, wherein, the impurities other than $CO_2$ having an affinity towards the adsorbent close to that of $CO_2$, pressurization stage a) is carried out several times and stage c) comprises at least two stages defined by:
   c1) one or more cocurrent partial depressurization stages,
   c2) one or more counter-current depressurization stages.

15. A method as claimed in claim 1 operated according to the PSA implementation, wherein, the impurities other than $CO_2$ having an affinity towards the adsorbent markedly lower than that of $CO_2$, at least one adsorbent bed comprises two different adsorbent types, the first one having a dynamic capacity of at least 2 mmole/g between an adsorption pressure ($P_{ads}$) of 5 MPa and a desorption pressure ($P_{des}$) of 0.4 MPa, and a second adsorbent for the adsorption of impurities other than $CO_2$.

16. A method as claimed in claim 15, wherein the two different adsorbents are distributed in at least two successive bed layers and pressurization stage a) is carried out several times, stage c) comprises two stages defined by:
   c1) one or more cocurrent partial depressurization stages,
   c2) one or more counter-current depressurization stages,
and stage d) comprises two stages defined by:
   d) a counter-current desorption stage at the $CO_2$ desorption pressure of between 2 and 0.4 MPa,
   e) a cocurrent or counter-current desorption stage at a low pressure ranging between 0.4 MPa and atmospheric pressure.

17. A method as claimed in claim 15, wherein the two different adsorbents are distributed in at least two specific beds.

18. A method as claimed in claim 17, comprising a first bed high-pressure adsorption stage b) carried out in series with a second bed, and the first bed desorption stage d) is carried out at high pressure in a counter-current flow.

19. A method as claimed in claim 17, comprising a second bed high-pressure adsorption stage b) carried out in series with the first bed, and stage c) comprises two stages defined by:
   c1) one or more cocurrent partial depressurization stages,
   c2) one or more counter-current depressurization stages,
and first bed desorption stage d') is carried out at low pressure in a counter-current flow.

20. A method as claimed in claim 1 operated according to the SMB implementation, comprising the following stages:
   a) a stage of contacting under adsorption conditions at a pressure $P_{ads}$ the feed (1) containing hydrogen and impurities with an adsorbent solid contained in a plurality of beds so as to adsorb impurities,
b) a stage of displacement of the hydrogen contained in interstitial and macroporous volumes of said adsorbent solid through sweeping by a stream (3) containing either desorbent or a mixture of impurities,
c) an adsorbent desorption stage comprising:
one or more cocurrent or counter-current depressurization substages at a high pressure $P_{des}$ lower than pressure $P_{ads}$, optionally with a desorbent allowing to obtain an extract stream (4) containing the impurities and part of the desorbent,
a desorption substage at pressure $P_{des}$ during which the bed is swept by a gas stream either desorbent or hydrogen (5), allowing to obtain an extract stream (6) containing the impurities and part of the desorbent,
one or more cocurrent or counter-current repressurization substages with part of the pure hydrogen stream (raffinate) or with a desorbent stream (7),
d) a stage of withdrawal of a raffinate (2) containing the purified hydrogen and possibly part of the desorbent,
e) in case of use of a desorbent, a stage of separation of the extract into a first stream containing the desorbent and a second stream containing the impurities,
f) in case of use of a desorbent, a stage of separation of the raffinate into a first stream containing the desorbent and a second stream containing the high-purity hydrogen.

21. A method as claimed in claim 1 operated according to the SMB implementation, comprising the following stages:
a) a stage of contacting under suitable adsorption conditions at a pressure $P_{ads}$ feed (1) containing hydrogen and impurities with an adsorbent solid contained in a plurality of beds so as to adsorb the impurities,
b) an adsorbent desorption stage comprising:
one or more cocurrent or counter-current depressurization substages at a high pressure $P_{des}$ lower than pressure $P_{ads}$, optionally with a desorbent, and allowing to obtain an extract stream (4) containing the impurities and part of the desorbent,
a desorption substage at pressure $P_{des}$ during which the bed is swept by a gas stream of desorbent or hydrogen (5), allowing to obtain an extract stream (6) containing the impurities and part of the desorbent,
one or more cocurrent or counter-current repressurization substages with part of the pure hydrogen stream (raffinate) or with a desorbent stream (7),
c) a stage of withdrawal of a raffinate (2) containing the purified hydrogen and optionally part of the desorbent,
d) in case of use of a desorbent, a stage of separation of the extract into a first stream containing the desorbent and a second stream containing the impurities,
e) in case of use of a desorbent, a stage of separation of the raffinate into a first stream containing the desorbent and a second stream containing the high-purity hydrogen.

22. A method as claimed in claim 1, coupled with membrane separation or a solvent extraction.

23. A method as claimed in claim 1, wherein a polar impurity is added to the feed to increase the dynamic capacity of the adsorbent.

* * * * *